US009928648B2

(12) United States Patent
Ambrus et al.

(10) Patent No.: US 9,928,648 B2
(45) Date of Patent: Mar. 27, 2018

(54) OBJECT PATH IDENTIFICATION FOR NAVIGATING OBJECTS IN SCENE-AWARE DEVICE ENVIRONMENTS

(71) Applicants: Anthony James Ambrus, Seattle, WA (US); Jeffrey Kohler, Redmond, WA (US)

(72) Inventors: Anthony James Ambrus, Seattle, WA (US); Jeffrey Kohler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 14/936,480

(22) Filed: Nov. 9, 2015

(65) Prior Publication Data

US 2017/0132839 A1    May 11, 2017

(51) Int. Cl.
G06K 9/00    (2006.01)
G06T 19/00    (2011.01)
(Continued)

(52) U.S. Cl.
CPC ........ G06T 19/003 (2013.01); G02B 27/0172 (2013.01); G06T 7/2033 (2013.01);
(Continued)

(58) Field of Classification Search
CPC ...................... G06T 19/003; G02B 2027/0138
See application file for complete search history.

(56) References Cited

U.S. PATENT DOCUMENTS 8,576,235 B1    11/2013 Sumner et al.
8,837,779 B2    9/2014 Meier
(Continued)

FOREIGN PATENT DOCUMENTS

WO    2014182545 A1    11/2014

OTHER PUBLICATIONS

Mulloni, et al., "Handheld Augmented Reality Indoor Navigation with Activity-based Instructions", In Proceedings of the 13th International Conference on Human Computer Interaction with Mobile Devices and Services, Aug. 30, 2011, 10 pages.
(Continued)

*Primary Examiner* — Oneal R Mistry
(74) *Attorney, Agent, or Firm* — Shook, Hardy & Bacon, L.L.P.

(57) ABSTRACT

In various embodiments, computerized methods and systems for identifying object paths to navigate objects in scene-aware device environments are provided. An object path identification mechanism supports identifying object paths. In operation, a guide path for navigating an object from the start point to the end point in a scene-aware device environment is identified. A guide path can be predefined or recorded in real time. A visibility check, such as a look-ahead operation, is performed based on the guide path. Based on performing the visibility check, a path segment to advance the object from the start point towards the end point is determined. The path segment can be optionally modified or refined based on several factors. The object is caused to advance along the path segment. Iteratively performing visibility checks and traverse actions moves the object from the start point to the end point. The path segments define the object path.

20 Claims, 15 Drawing Sheets

(51) Int. Cl.
  *G02B 27/01* (2006.01)
  *G06T 7/20* (2017.01)
  *G06T 7/60* (2017.01)

(52) U.S. Cl.
  CPC .............. *G06T 7/60* (2013.01); *G06T 19/006* (2013.01); *G02B 2027/014* (2013.01); *G02B 2027/0138* (2013.01); *G02B 2027/0141* (2013.01); *G06T 2210/21* (2013.01)

(56) References Cited

U.S. PATENT DOCUMENTS

| | | | |
|---|---|---|---|
| 8,884,984 B2 | 11/2014 | Flaks et al. | |
| 9,026,301 B2* | 5/2015 | Zini | G05B 19/41895 |
| | | | 700/245 |
| 2004/0049341 A1 | 3/2004 | Fujiwara | |
| 2004/0119662 A1 | 6/2004 | Dempski | |
| 2006/0224304 A1 | 10/2006 | Hudson et al. | |
| 2008/0220862 A1 | 9/2008 | Axelrod et al. | |
| 2008/0231628 A1 | 9/2008 | Shearer | |
| 2009/0226113 A1* | 9/2009 | Matsumoto | G06K 9/00691 |
| | | | 382/284 |
| 2010/0287511 A1 | 11/2010 | Meier et al. | |
| 2011/0165939 A1 | 7/2011 | Borst et al. | |
| 2012/0120113 A1 | 5/2012 | Hueso | |
| 2012/0127062 A1 | 5/2012 | Bar-Zeev et al. | |
| 2012/0197439 A1* | 8/2012 | Wang | B25J 9/1689 |
| | | | 700/259 |
| 2014/0104274 A1 | 4/2014 | Hilliges et al. | |
| 2014/0282220 A1 | 9/2014 | Wantland et al. | |
| 2014/0375683 A1 | 12/2014 | Salter et al. | |
| 2015/0002542 A1 | 1/2015 | Chan et al. | |
| 2015/0100179 A1* | 4/2015 | Alaniz | A63F 13/00 |
| | | | 701/1 |
| 2015/0120080 A1* | 4/2015 | Densham | A63J 1/00 |
| | | | 700/302 |
| 2016/0078759 A1* | 3/2016 | Nerayoff | G06Q 20/145 |
| | | | 701/3 |

OTHER PUBLICATIONS

Brass, et al., "Shortest Path Planning for a Tethered Robot", In Journal of Computational Geometry, vol. 48, Issue 9, Jun. 23, 2015, pp. 732-742.

Choi, et al., "Safe and High Speed Navigation of a Patrol Robot in Occluded Dynamic Obstacles", In Proceedings of the 17th World Congress the International Federation of Automatic Control, vol. 41, Issue 2, Jul. 6, 2008, pp. 1685-1690.

"International Search Report & Written Opinion Issued in PCT Application No. PCT/US2016/060208", dated Jan. 18, 2017, 15 Pages.

* cited by examiner

OBJECT PATH IDENTIFICATION FOR NAVIGATING OBJECTS IN SCENE-AWARE DEVICE ENVIRONMENTS

BACKGROUND

In the real world, an individual walks through an environment while competently avoiding any obstacles in their surroundings. The individual also selects one of many suitable paths for getting from one location to another. As such, the individual usually does not run into barriers (e.g., furniture or walls) and can efficiently walk from one location to another. Modern technology has led to the development of scene-aware devices, where scene-aware devices generally refer to devices that have an understanding of a real world environment defined as a scene-aware device environment (i.e., a virtual environment supported in the scene-aware device). A scene-aware device also supports objects, which are virtualized entities, having functionality that is performed using the scene-aware device. Navigating an object in a scene-aware device environment, in a resource efficient manner, presents several challenges because of the complexity and variability of scene-aware device environments in contrast to other simpler and consistent virtual environments.

SUMMARY

Embodiments described herein provide methods and systems for identifying object paths to support navigating objects in scene-aware device environments. Scene-aware device environments include real world environments that are captured and virtualized in scene-aware devices and provided to be navigated by objects (i.e. virtualized entities) using object paths in the scene-aware devices. An object path may refer to a path that is an optimal route, favorable route, track, or course along which the object traverses to navigate from a start point to an end point. An object path is defined based on identifying path segments. A path segment refers to a portion of the object path defined for an object from a current location of the object to a target location. An object can then traverse from the current location to the target location. In this regard, over time, the set of current locations of the path segments define the object path, and the set of target locations indicate targets the object traverses to, while following the object path. Identifying path segments for an object path, while an object traverses the object path, advantageously includes minimal computation compared to other object navigation solutions. In particular, object path identification is based on iteratively performing systematic visibility checks to identify path segments that define the object path for an object to navigate scene-aware device environments. The systematic visibility checks can advantageously be low-cost operations that are not resource intensive, in that, the visibility checks do not require extensive understanding of the environment in its entirety.

In various embodiments of the present disclosure, the systematic visibility checks may be performed based on guide paths (e.g., predefined guide paths or real time guide paths) that are captured for an environment. The guide paths are captured, using the scene-aware devices (e.g., a head mounted device that supports augmented reality or mixed reality images or other types of scene-aware devices). For example, while a user wearing the head mounted device traverses an environment, a guide path is captured. The guide path is alternatively captured manually when a user inputs a guide path (e.g., drawing a path from a start point to an end point) for a scene-aware environment. As such, a guide path for navigating an object is identified.

In operation, when a user wants to navigate an object from a start point to an end point, an object path between the start point and the end point is identified based on the guide path. Several path segments, each having a current location and a target location, are identified to define the object path. The collection of path segments is the progression of pairs of a current location and a potential target location over time. The set of path segment current locations define the object path. The set of target locations correspond to targets that the object traverses to, while following the object path, to cause the desired motion. Visibility checks allow the object to be navigated along the path segments (of an object path) based on opportunistically looking ahead along the guide path and checking that path for occlusions. Path segments are identified based on visibility check operations performed based on the guide path. The visibility check attempts to determine the furthest point on a guide path that is un-occluded from the current location of the object. The furthest point is identified as the target location of the path segment. For example, an object at a current location determines a target location based on a point on the guide path determined by a visibility check at that time. The systematic visibility check operations are performed iteratively to identify path segments until the object navigates from the start point to the end point. In other words, a visibility check (e.g., look-ahead operation) can facilitate defining a path segment which the object traverses and then performs another visibility check to define another path segment, which the object also traverses. The visibility checks and traverse actions move the object from a starting point to an end point. Visibility checks limit the capacity of an object to run into occlusions (e.g., walls and other environment attributes identified as occlusions).

Visibility checks and causing traversal of path segments may be performed based on casting techniques (e.g., ray casting or sphere casting). Casting techniques facilitate identification of suitable object paths and actuating traversal of object paths based on anticipated object attributes (e.g., dimensions, motion feature, etc.) of an object utilizing the object paths. It is contemplated that remedial actions can be defined when visibility checks that help define paths segments or traverse paths segments identify occlusions in a guide path or a path segment.

In embodiments, supplementary operations that refine guide paths can be defined and implemented during path segment identification and navigation of an object. For example, a supplementary operation can include smoothing turns of a path segment and/or relaxing a height of a path segment, as discussed herein in more detail. Other supplementary operations can include adapting a path segment to a defined motion feature (e.g., manner of movement such as flying, hopping, or crawling) of an object. In this regard, the same guide path may be adapted into different types of object paths based on applying different supplemental operations to the guide path.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1A:
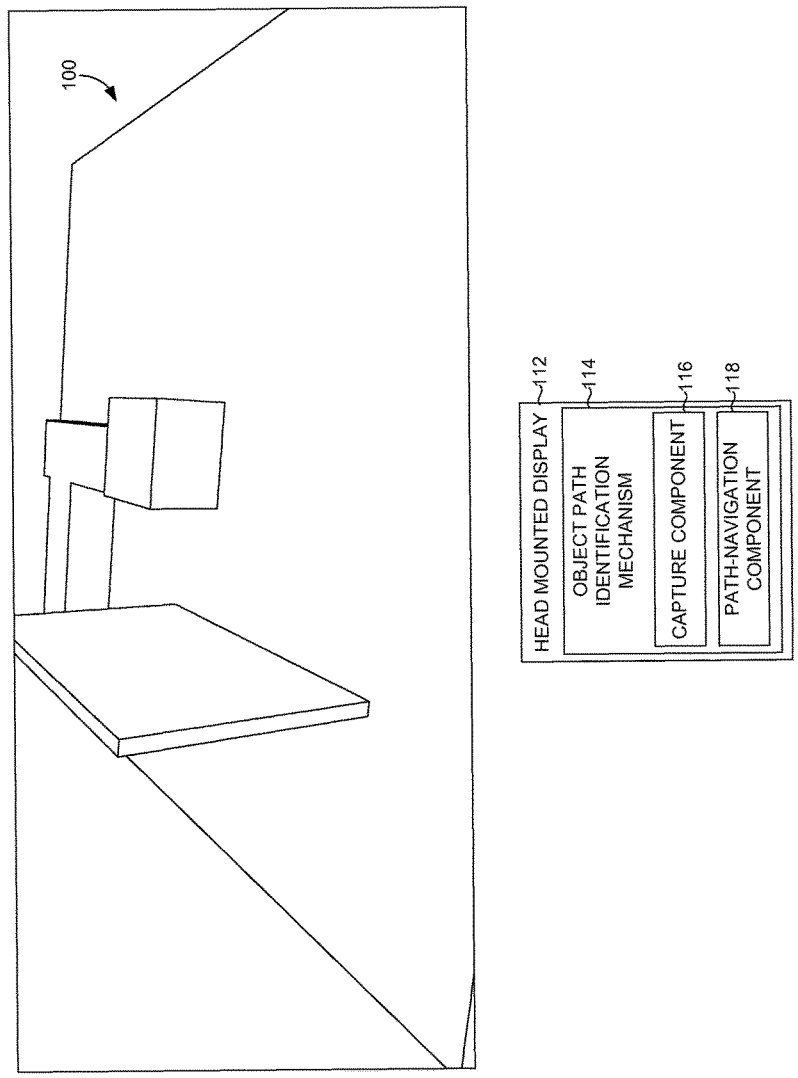
FIGS. 1A-1B are schematics showing an exemplary scene-aware device environment and a head-mounted display unit having an object path identification mechanism, in accordance with embodiments of the present invention.

Modern technology has led to the development of scene-aware devices, where scene-aware devices generally refer to devices that have an understanding of environments or scenes as scene-aware device environments in which scene-aware device objects operate. Understanding of an environment can be based on several different techniques that provide the scene-aware device with information of the environment. For example, an environment may be scanned in real-time and a mesh representation of the environment and obstacles can be dynamically generated to provide the scene-aware device with information on the environment.

Scene-aware devices can support augmented-reality or mixed-reality experiences and other user experiences that include navigating objects in representations of environments. Objects can be used in a variety of different implementations (e.g., video games, entertainment, productivity tools, etc.) as entities that perform acts based on actuators from the user or the environment itself. For example, objects may navigate a scene-aware device environment of the user based on directions from the user. A user can direct an object to follow the user in the environment, or a user may indicate that an object should navigate from a first location to a second location. However, navigating an object in an environment via a scene-aware device can present several challenges because of the variability and complexity in scene-aware device environments not usually found in other simple and consistent environments (e.g., video game spaces). Moreover in other virtual environment contexts, resources are likely not as scarce as in a scene-aware device and navigating these virtual environments may generally be resource-intensive (e.g., time and memory) and include performing calculations to identify 3-D path fields. Additionally, virtual environments are usually known in detail ahead of time, so computing object navigation can make use of known information and navigation does not include restrictions found in scene-aware device environments. Further, pre-computing solutions may not always be possible depending on the particular context and pre-computing solutions may also take a long time.

Embodiments of the present disclosure provide simple and efficient methods and systems for object path identification based on performing systematic visibility checks to identify path segments that define object paths for objects to navigate scene-aware device environments. In embodiments, the systematic visibility checks may be performed based on guide paths that have been captured for an environment. The guide paths may be captured, using the scene-aware devices (e.g., a head mounted display device that supports augmented reality or mixed reality images or other types of scene-aware devices). For example, while a user wearing the head mounted device traverses an environment, a guide path is captured in real time or the guide path is alternatively captured manually through direct user input that defines the guide path. As such, a guide path for navigating an object is identified.

Figure 1B:
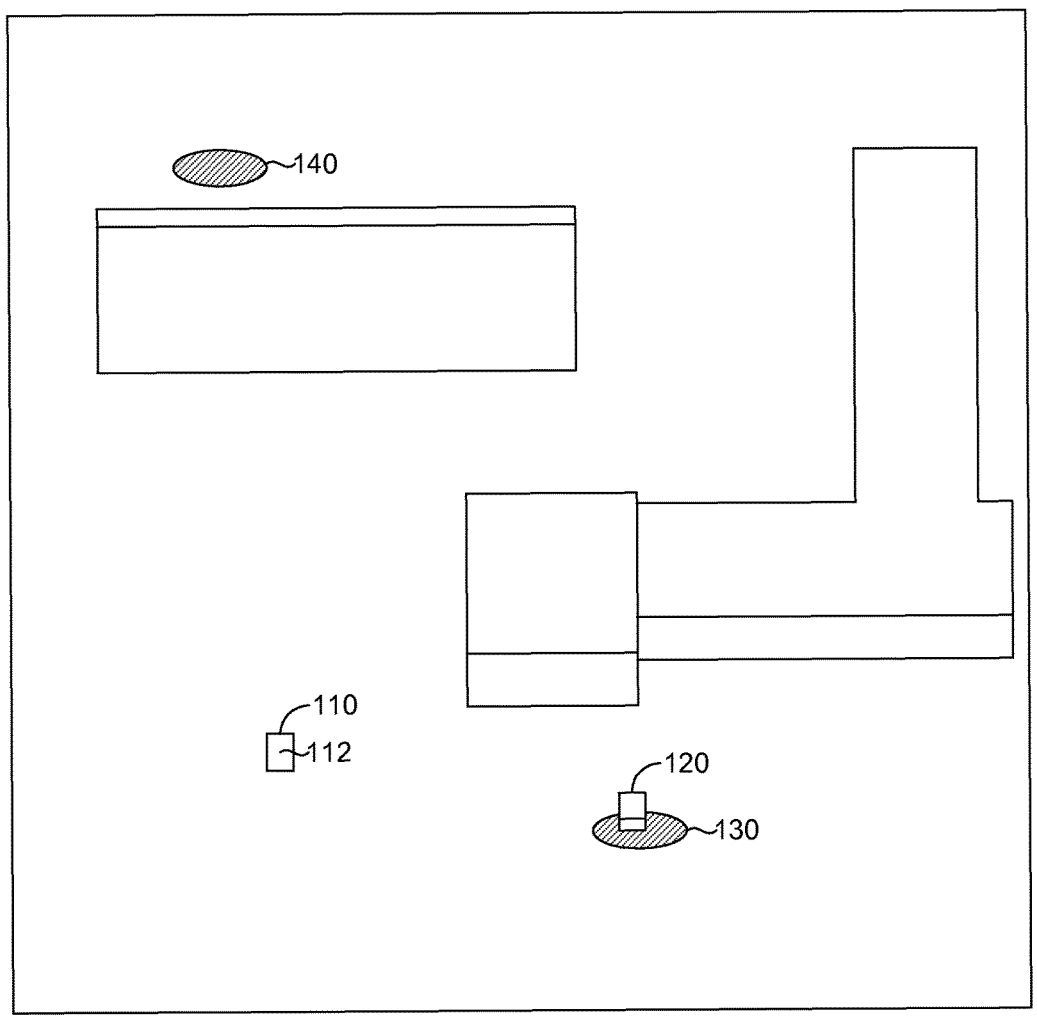
Figure 2:
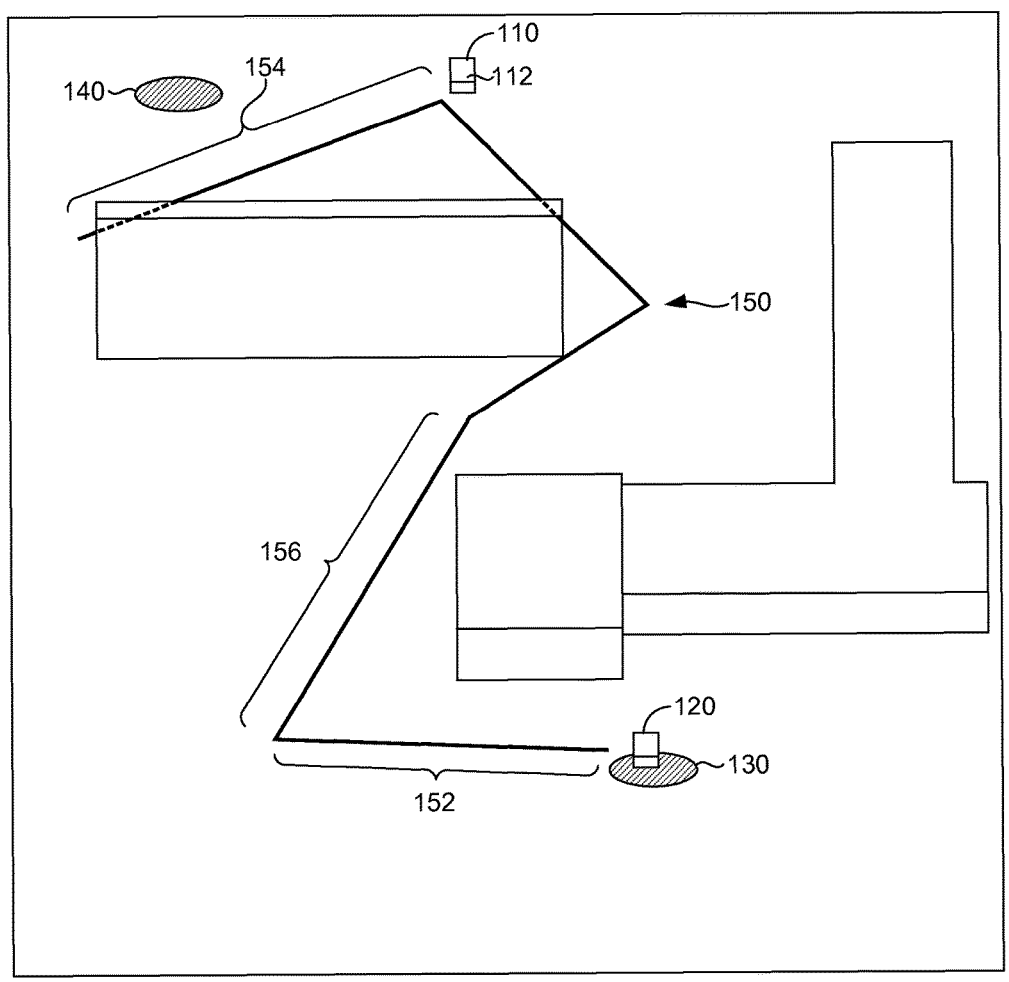
FIG. 2 is a schematic of an exemplary implementation of object path identification, in accordance with embodiments of the present invention.
Figure 3:
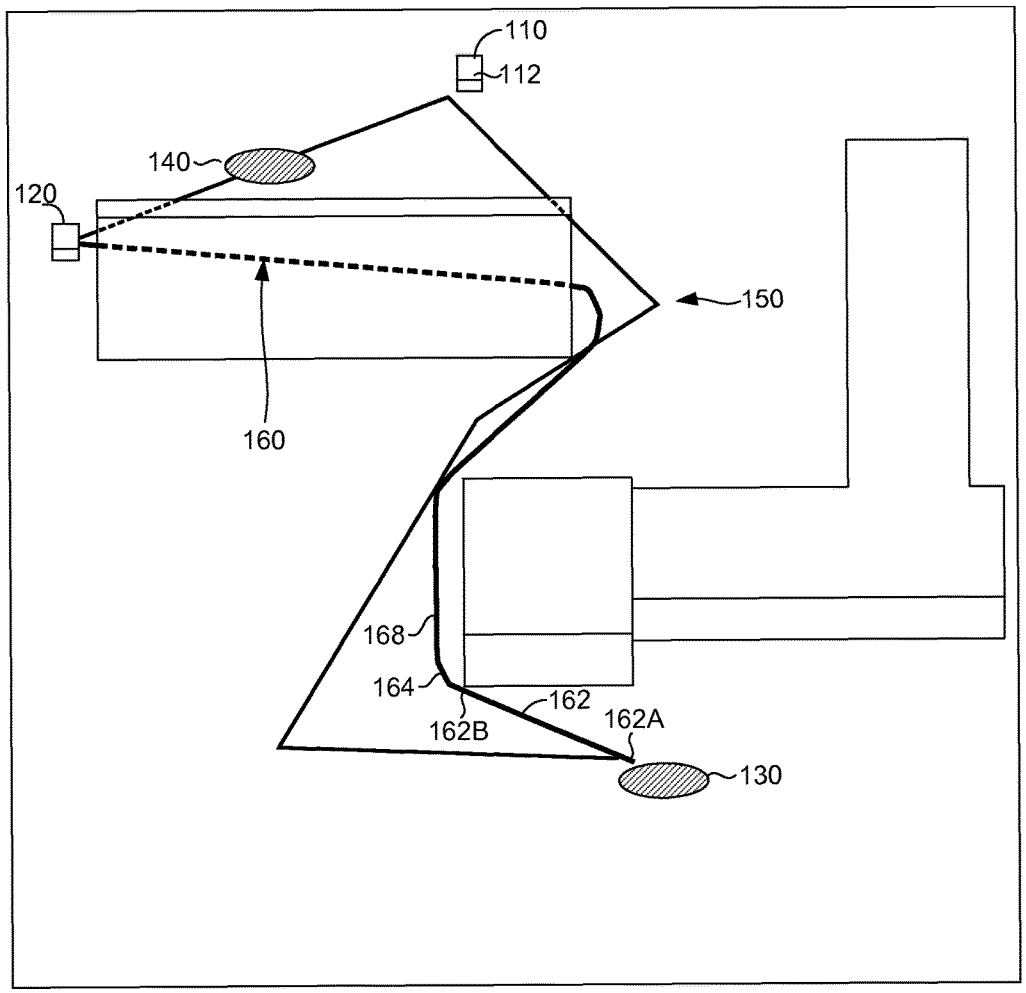
FIG. 3 is a schematic of an exemplary implementation of object path identification, in accordance with embodiments of the present invention.

With reference to FIGS. 1-3, embodiments of the present disclosure can be explained in more detail, using examples, with reference to a user 110 associated with a scene-aware device that is a head mounted device (HMD) 112. In FIG. 1A, an exemplary scene-aware device environment 100 is shown along with the HMD 112. The HMD 112 includes several components (e.g., object path identification mechanism 114 having a capture component 116 and a path-navigation component 118). The components facilitate identifying object paths for navigating an object from a start point 130 to an end point 140 in the scene-aware device environment associated with the HMD 112. In FIG. 1B, the user 110 wears the HMD 112. The HMD 112 can include a capture component 116 that is associated with a camera that captures the real world environment. The HMD 112 may specifically include a depth camera that supports understanding elements of a scene or environment, for example, generating a 3-D mesh representation of an environment.

In FIG. 2, when the user 110 wants to navigate the object 120 from the start point 130 to the end point 140 in a scene-aware device environment, the object 120 may be navigated based on a guide path 150. The guide path 150 may include guide path portions (e.g., portion 152 and 154) that are not explicitly traversed by a user 110. For example, a distance from the object 120 to the user 110, when the user 110 is selecting the object 120 for navigation or selecting the end point 140 for navigation may not be actually traversed by the user 110 but captured as part of the guide path 150. The guide path 150 includes portions (e.g., central portion 156) that are traversed by a user.

In FIG. 3, several path segments (e.g., 162, 164, 166 and 168) define an object path 160. Several path segments, each having a current location and a potential target location, are identified to define the object path 160. For example, path segment 162 includes a current location 162A and a target location 162B. The collection of path segments (e.g., 162, 164, 166 and 168) is the progression of pairs of a current location and a target location over time. The set of path segment current locations defining the object path 160. The set of target locations correspond to targets that the object traverses to, while following the object path 160, to cause the desired motion. It is important to note that when the object is at the end point 140 as the current location, there exists no additional target location, as such, the last path segment can be defined based only on the current location of the object without a target location.

Visibility checks allow the object to be navigated along the path segments (of an object path) based on opportunistically looking ahead along the guide path 150 and checking the guide path for occlusions. At a high level, the visibility check attempts to determine the furthest point on a guide path that is un-occluded from the current location of the object. The systematic visibility checks are performed iteratively to identify target locations of the path segments until the object 120 is navigated from the start point 130 to the end point 140. A target location is a point determined by the visibility check from a current location using techniques described herein. The target location is identified proximate an occluded location on the guide path with reference to a current location of the object. It contemplated that position information of objects and paths can be determined using known techniques for determining position information in scene-aware device environments. For example, a Cartesian coordinate system, in a three-dimensional space may be implemented such that the start point, the end point, the guide path, the object path are represented with ordered triplet of lines (axes). As such, based on the position information, comparisons can be made between different points in the scene-aware environment in order to support functionality described in this disclosure.

Casting techniques (e.g., ray casting or sphere casting) can be used in executing functionality for object path 160 identification. By way of background, casting techniques are used to understand and make meaning of elements in multi-dimensional virtual environments. For example, ray casting (or tracing) can be used to determine if a first object is intersected by a ray, or sphere casting can be used to determine a first object intersected by a sphere. In particular, the sphere can include specific spherical attributes (e.g., dimensions) that correspond to anticipated objects that will utilize object paths defined based on sphere casting. In embodiments disclosed herein, executing visibility checks can be based, at least in part, on attributes of anticipated objects that will traverse an object path by using casting techniques. For example, casting can be used to determine occlusions, such that, an object path 160 is defined. In particular, casting identifies occlusions or the lack thereof so that the identified object path accommodates particular attributes (e.g., movement and size). In other examples, casting may be used to determine height, depth, and other elements of a scene-aware device environment. In operation, a guide path is generated based on tracking a user wearing an HMD unit, and then casting is performed based on attributes of the object (e.g., a small hopping dog, a medium-sized flying bird, or a large roving robot), as such, an object path 160 is appropriately defined and traversed while avoiding occlusions. Other variations and combinations of implementations of casting for object path identification are contemplated with embodiments described herein.

With reference to FIGS. 4A-4D the HMD captures and/or receives guide paths that are used in identifying an object path. At a high level, the user 110 operates a scene-aware device (e.g., HMD 112) and travels along a path and the path is recorded and stored as a guide path for navigating objects in the environment. A guide path 150 can be recorded in real time as the user selects the start point 130 and the end point 140 for navigating the object 120; the HMD 112 records a guide path 150 as the user walks to identify the start point 130 to the end point 140. It is contemplated that a guide path 150 may be manually defined in a scene-aware device environments based on input from a user 110 via an interface supported at the HMD 112. For example, given a representation of an environment, a user 110 may simply draw one or more guide paths between locations in the environment. As such, the guide path can also be recorded in advance.

Figure 4A:
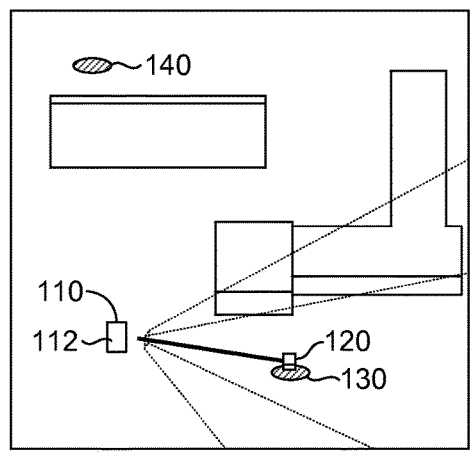
FIGS. 4A-4D are schematics of exemplary implementations of object path identification, in accordance with embodiments of the present invention.
Figure 4B:
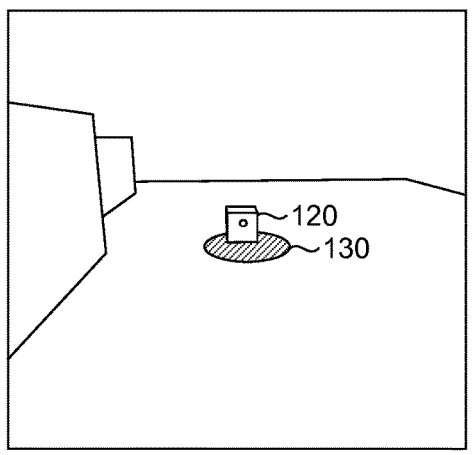
Figure 4C:
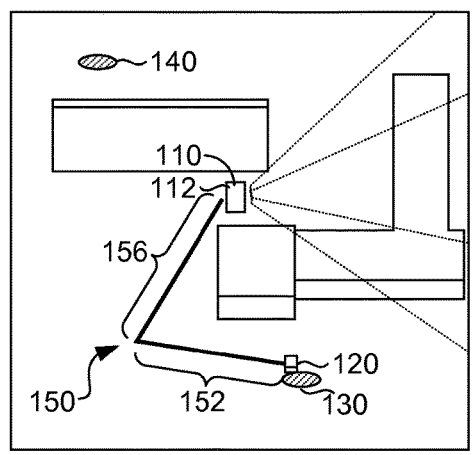
Figure 4D:
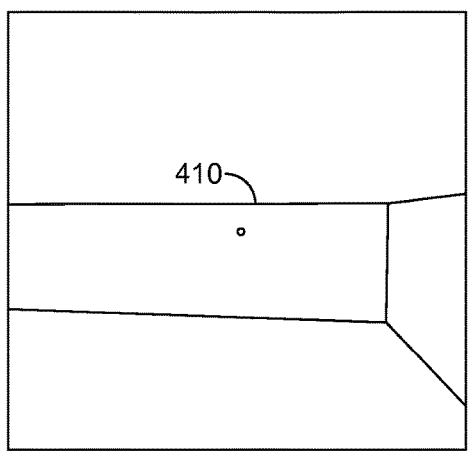

The user 110 while wearing the HMD 112 looks at the start point 130 (e.g., a location having the object 120 to be moved). The user 110 may identify the start point 130 with a cursor or other symbol indicating the start point 130. The cursor may be placed on the nearest surface of a start point 130 along the user's line of sight. As shown in FIG. 4B, it is contemplated that the user 110 is positioned to have a clear line of sight with the object 120 they want to select. At this point, a path portion 152 (e.g., anterior path portion) from the start point 130 to the user's head location is recorded. As shown in FIG. 4C, the user 110 is traversing towards the end point 140 (e.g., a location where the object 120 is to be moved to). As shown in FIG. 4D, while walking within the environment with the HMD 112 on, the user does not pass through obstacles 410 represented in the environment mesh. Also, as the user 110 moves, the HMD 112 records path information based on a depth camera position (e.g., head position). In operation, as the user 110 moves, if a line between a last saved head position and the current head position becomes occluded (e.g., the user walks behind a wall) the last un-occluded line is added to the path recording for the guide path.

Figure 5A:
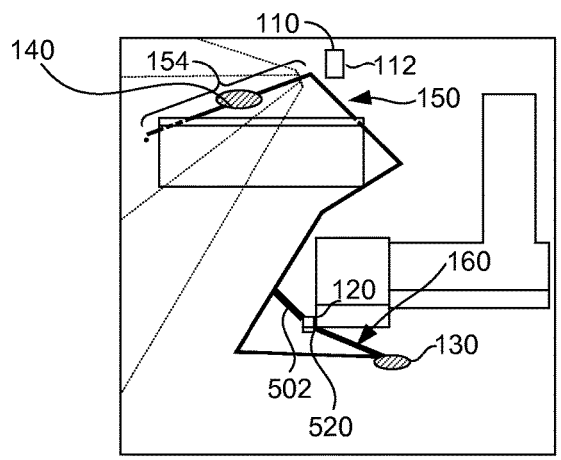
FIGS. 5A-5D are schematics of exemplary implementations of object path identification, in accordance with embodiments of the present invention.
Figure 5B:
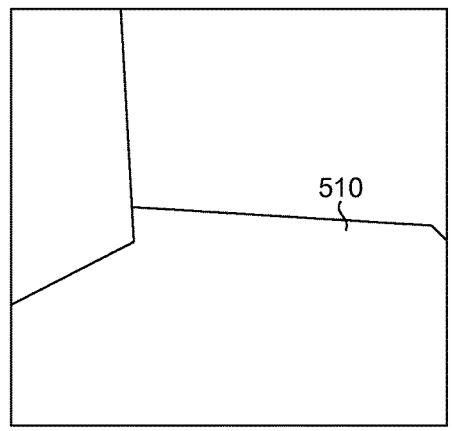
Figure 5C:
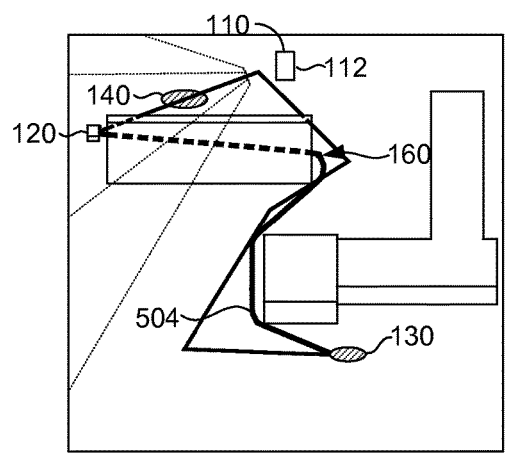
Figure 5D:
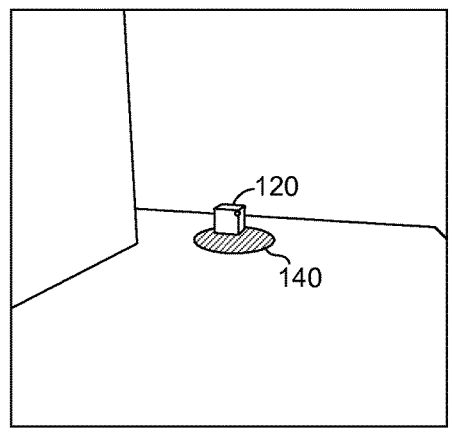

With reference to FIGS. 5A-5D, an illustration of the completion of the guide path recordation process and the user 110 can actuate an object to move from the start point 120 to the end point 140 is provided. The guide path recordation process may be iteratively performed until the user 110 is in a position where the user 110 can see the location they want the object 120 moved to, as shown in FIG. 5A. The line from the last saved head position to the current head position is added, and then the line or path portion 154 (e.g., a posterior path portion) from the head position to the end point is also added. A posterior portion can extend beyond the end point until a point where an occlusion exists. The guide path 150 is used as the framework for object navigation. Other combinations and variations of defining guide paths within scene-aware device environments are contemplated with embodiments of the present invention.

The user 110 of the HMD 112 may actuate navigation of an object from the start point 130 to the end point 140 in the environment associated with the HMD 112. As discussed, in embodiments where a predefined guide path is used, the start point 130 and the end point 140 can be received, and then a guide path is selected from a guide path repository where the selected guide path facilitates navigating the object 120. The object 120 can move from the start point 130 to the end point 140 based on a selected guide path or real time captured guide path. Upon identifying a guide path, the object 120 may opportunistically perform visibility checks (e.g., look-ahead operations) for occlusions along the guide path to traverse from the start point 130 to the end point 140. At a high level, the visibility check attempts to determine a furthest un-occluded point that is un-occluded from a current point of the object. The visibility checks may be performed as often as possible to determine if a next point in the guide path is un-occluded from a current position of the object. Performing the visibility checks repeatedly during movement of the object functions to determine an object path 160 that is an optimal path with minimal computation. For example, the object 120 has been caused to traverse along the object path 160 to the current point 520. Another visibility check can be performed from the current point 520 to identify path segments all the way to the end point 140. As the path segments are defined, the object 120 can traverse the path segments from the current point 520 to the end point 140.

The object 120 may be caused to traverse the path segment based on a motion feature associated with the object, as discussed below in more detail. At a high level, a guide path can be used to define a path segment, the path segment is adapted to accommodate a motion feature (e.g., crawling, flying, hopping) of an object. In an exemplary implementation, the path segment may be adapted to the motion feature based on casting in the scene-aware environment with reference to attributes of the object corresponding the motion feature associated with the object. The object 120 is then caused to traverse along an adapted path segment using the motion feature.

With continued reference to FIGS. 5A-5D, the HMD 112 may also implement supplementary operations (e.g., a smoothing operation or a relaxation operation) that are defined and implemented for identifying an object path used in navigation of an object. A smoothing operation is implemented on the path segment 502 to smoothen the path segment 502 to path segment 504. In operation, the smoothness of a path can be increased by doing a binary search between the furthest un-occluded point in the path (lower bound) and the subsequent occluded point (upper bound). A binary search is a comparison-based algorithm to identify a target value. A lower bound location indicates the furthest un-occluded point on the guide path 150. An upper bound location is the subsequent occluded point on the guide path 150. The binary search operates to determine a point (e.g., a midpoint) between the lower bound and the upper bound. When it is determined that the midpoint is un-occluded, the midpoint becomes the new lower bound and the binary search is repeated. When it is determined that the midpoint is occluded, the midpoint becomes the new upper bound and the binary search process is repeated. Based on iteratively performing the binary search, the furthest un-occluded location on the guide path may be more closely approximated to smoothen the object path, for example, from path segment 502 to path segment 504.

With reference to FIGS. 6A-6D, embodiments of the present disclosure support executing a path height relaxation operation on a guide path 612 to define an object path 614 for navigating an object 610. By way of example, with reference to an HMD unit (not shown) worn by a user, the guide path 612 is captured at the height of the head of the user (e.g., guide path height). This may be an undesired feature of the guide path 612 as the object navigation may try to match a height of an object path being identified to a height of the guide path when the object may not always be suitable to rise to the guide path height. Other factors may affect the height of an object path based on a path guide. For example, an object path may be defined to rise more than it needs to so the object can navigate around a wall. Or an object may have to navigate from a first platform (e.g., table) to a second platform (e.g., a location below the table), where the first platform is higher than the second platform, and the object does not need to first navigate to the HMD location, as captured on a guide path, and then navigate down to the second platform.

Figure 6B:
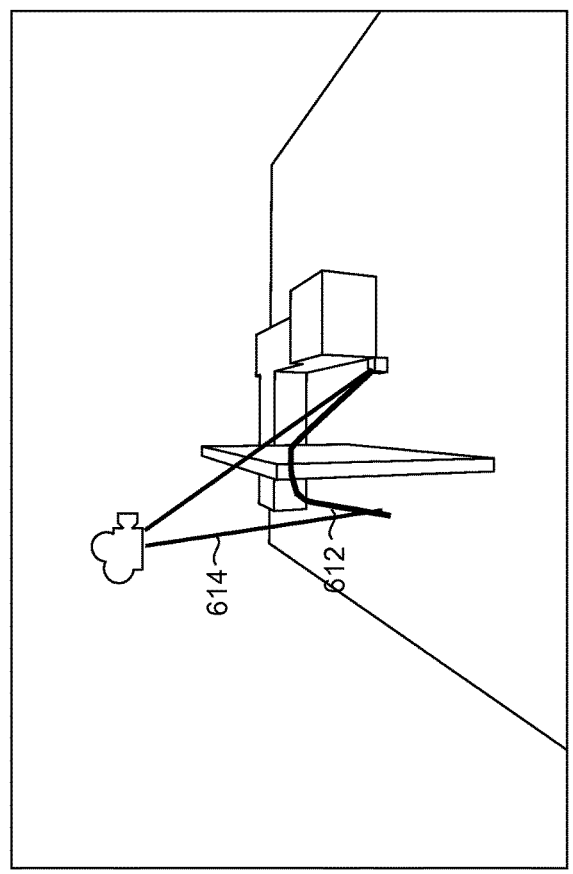
FIGS. 6A-6D are schematics of exemplary implementations of object path identification, in accordance with embodiments of the present invention.
Figure 6A:
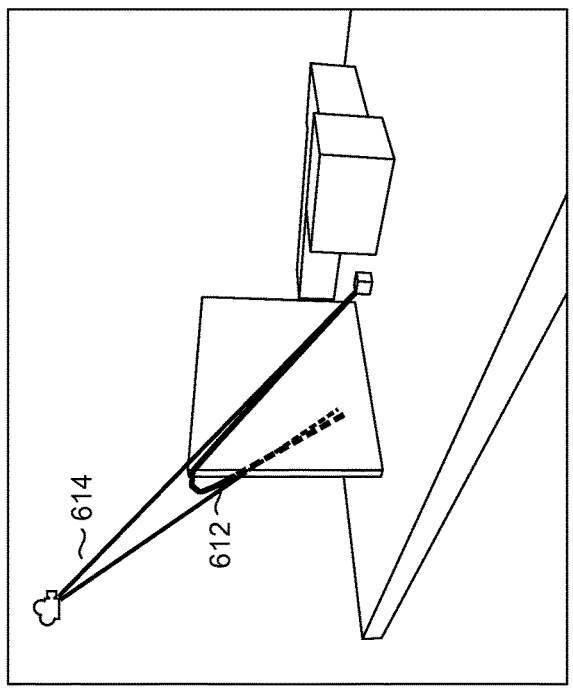
Figure 6D:
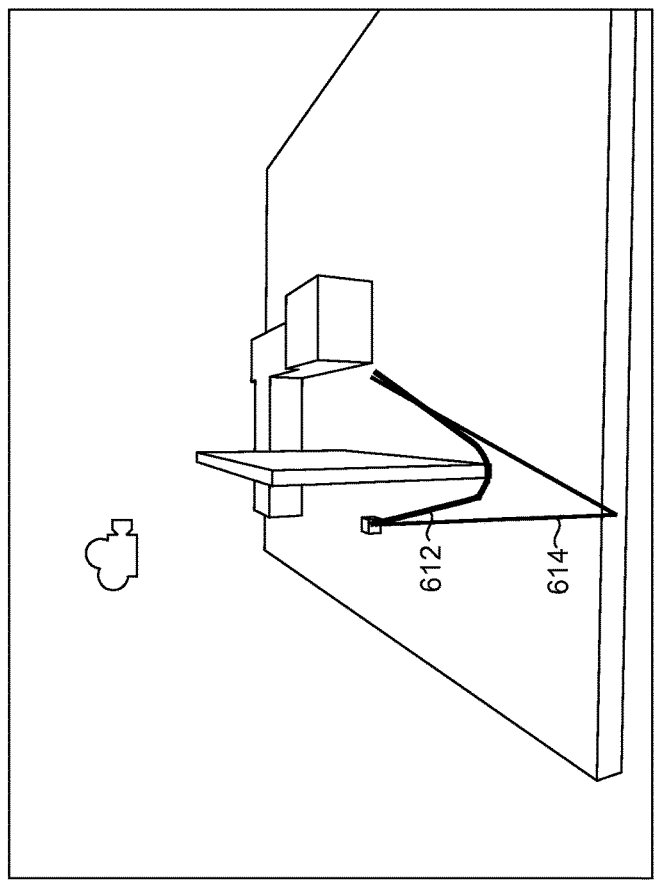
Figure 6C:
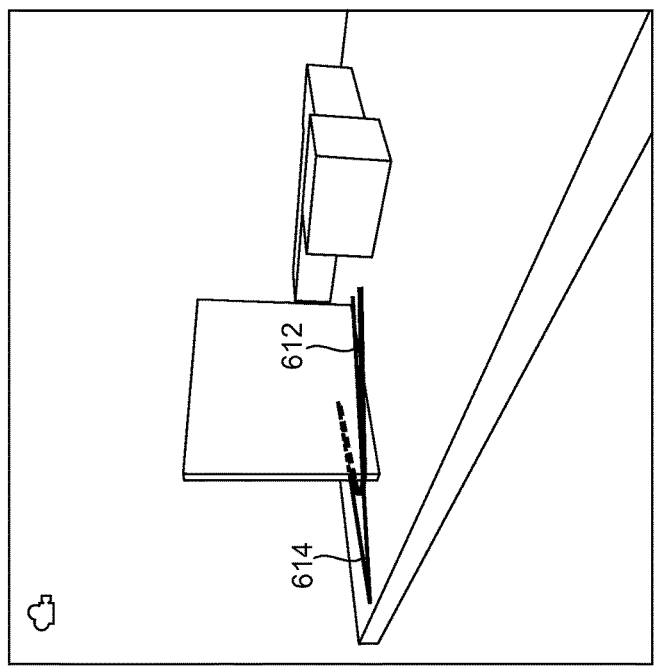

In FIG. 6A, the guide path 612 for the object 610 can be identified, where the guide path 612, as shown using a hypothetical camera 620, can extend beyond an actual path traversed by a user. Using a path relaxation operation, the object path height can be relaxed. In particular, the relaxation operation is iteratively performed on the guide path 612 to define the object path 614. The relaxation operation is based on selecting a point (e.g., an adjustment pivot point) on the guide path. The adjustment pivot point can be a midpoint between of a current location (previous point) and a target location (next point) of the guide path 612. The average height of the previous point and the next point is determined. When the partial path segments between the previous point, the adjustment pivot point at the average height, and the next point are not all un-occluded, the object path is further determined based on visibility checks as described above. When the partial path segments between the previous point, the adjustment pivot point at the average height, and the next point are all un-occluded, the adjustment pivot point at the average height replaces the next point in the guide path, which is then used to define the object path. The relaxation operation advantageously quickly minimizes the height distance the object needs to travel, while still avoiding obstacles. As shown in FIGS. 6D and 6E, a previous object path is adjusted to minimize the height change along the path.

Figure 7A:
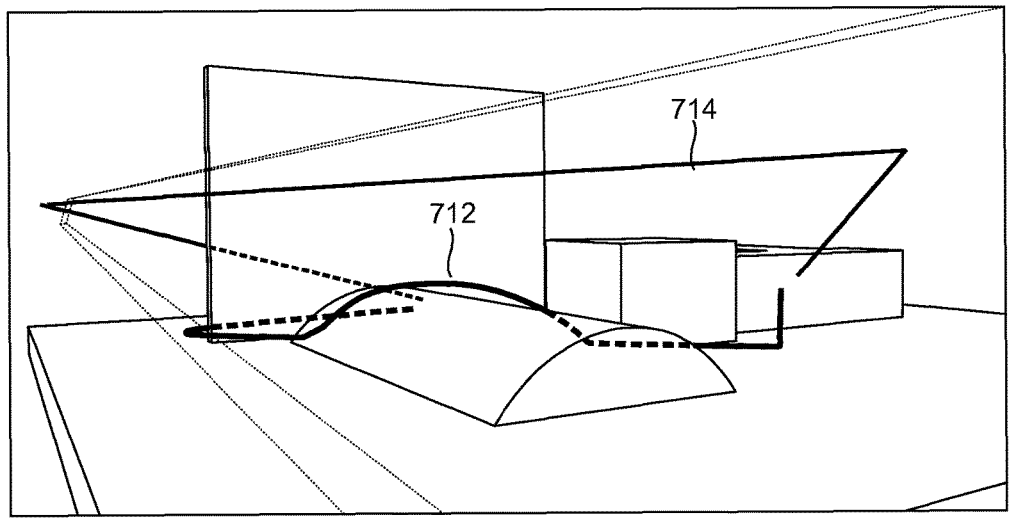
FIGS. 7A-7B are schematics of exemplary implementations of object path identification, in accordance with embodiments of the present invention.
Figure 7B:
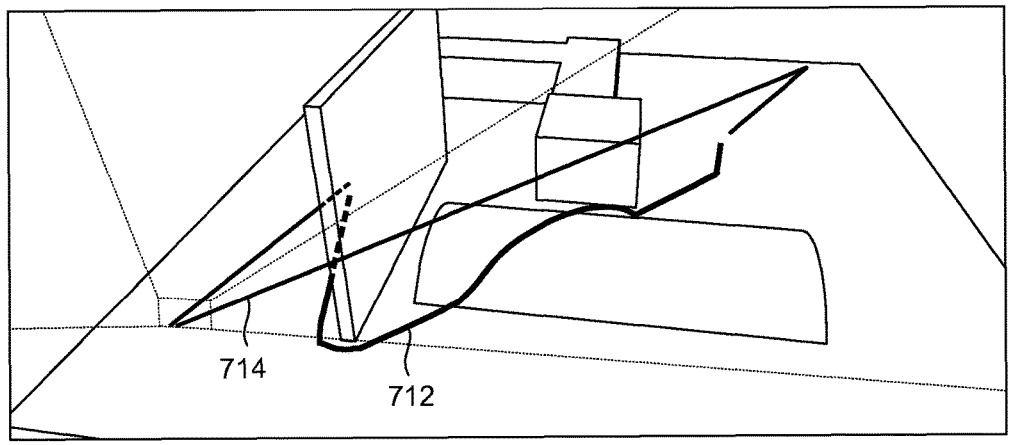

With reference to FIGS. 7A and 7B, the HMD 112 may apply a movement adaptation operation to the path and navigation of an object. By way of example, an object in the scene-aware device environment may have a particular motion feature (e.g., crawling, hopping, or fly). An object path is defined to accommodate the motion features. In operation, a motion feature corresponds to movement associated with the object. The motion feature is applied when defining an object path 714 or path segments from a guide path 712, such that, the object path 714 is adapted to incorporate the motion feature. As shown in FIGS. 7A and 7B, a guide path 712 is generated and an object path 714 is defined based on visibility checks that include movement adaptation operations that are further applied to the guide path. It contemplated that casting techniques can be used to simulate the motion feature of the object and define the object path. In one example, an object can be made to move along the ground by simply doing a ray cast to find the ground height. The effect, as shown, is the object hugs the ground and climbs over the cylinder.

With reference to FIG. 1A, FIG. 1A includes an object identification mechanism 114 that supports identifying object paths for navigating objects in scene-aware device environments. The object identification mechanism 114 includes a capture component 116 and a path-navigation component 118 that each facilitate implementing the functionality of the object identification mechanism 114 as described herein. A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof.

Other arrangements and elements (e.g., machines, interfaces, functions, orders, and groupings of functions, etc.)

can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The capture component 116 further supports functionality that is directed to capturing a real world environment as a scene-aware device environment that is a virtual representation of the real world environment and capturing guide paths that are defined for the scene-aware device environment. In one embodiment, the capture component 116 can receive information from the depth camera and facilitate generating a representation (e.g., 3-D mesh) of the environment. The scene information can be captured in advance or in real time based on functionality supported in the scene-aware device. The capture component 116 may also identify attributes of the scene elements within the scene, for example, the scene information may identify surfaces, walls and furniture to help determine objects that are occlusions (i.e., not traversable by other objects). Other types of cameras and methods of scene-aware devices for capturing and generating representations and providing information about environments are contemplated with embodiments described herein. The capture component 116 communicates the scene-aware device environment and information to the path-navigation component to execute functionality supported using the object path identification mechanism.

The capture component 116 is also responsible for identifying guide paths that support identifying an object path used to navigate an object. Several different types of guides paths are contemplated with embodiments described herein. A guide path may be a predefined guide path (or combination of guide paths) that is stored in a guide path repository or a real time guide path generated in real time. Advantageously, the guide paths may be defined based on tracking a user as anytime the user walks in the real world scene that is virtually recreated as a scene-aware device environment. For example, a user walking in their home while wearing an HMD supports the capture component 116 in a defining guide path, in that, while the user is walking the capture component 116 captures user position information (e.g., pose data) in the environment and tracks valid paths (i.e., paths without occlusions in the environment). A plurality of valid paths may be designated as guide paths individually or in combination as a set of intersecting paths for traversing the scene-aware device environment.

In the alternative, a guide path may be identified only when a user wants to navigate an object and in real time tracking, the user makes a selection of the start point of the object and the end point of the object. During the selection of the start point and the end point a guide path is determined in real time for navigating the object from the start point to the end point. It is contemplated that the term real time may refer to near real time or sufficiently real time as understood in the art. Real time may be affected by delays in communication between components. As such, real time information may include information obtained in light of delays to operate the functionality described herein. The use of real time is not meant to be limiting but contemplates continuous processing of information in contrast to delayed processing of information.

By way of example, an object to be navigated may be selected based on an interface associated with scene-aware device (e.g., HMD). When the user selects the object at a start point at a first location the user walks and selects an end point at a second location. As the user walks, the capture component 116 captures the user position information and generates a guide path for navigating the object. In one example, a user may not explicitly traverse a path from a start point to an end point but still identify the start point to the end point. In this regard, a real time guide path may be defined with an anterior path portion, a central path portion, and posterior path portion, where the anterior path portion and the exterior path portion are portions of the guide path that are not explicitly traversed when generating the real time guide path. As such, when an indication of a start point and end point is retrieved, a guide path, predefined or real time, is identified and used in defining path segments that define an object path to navigate the object.

In one embodiment, both the predefined guide paths and real time guide paths may be defined based on a manual indication of a selection of a guide path in the scene-aware device environment. For example, the capture component 116 may operate with an interface that supports presenting the scene-aware environment received from the scene information component and receiving an indication of a guide path for the scene-aware environment. In this regard, a plurality of predefined guide paths can be received in advance and stored while a real time guide path can be received while configuring navigation of an object from a start point to an end point.

The path-navigation component 118 is responsible for identifying an object path for an object and causing the object to traverse the object path from a start point to an end point. The path-navigation component 118 can select a guide path that is used as the framework for defining the object path. As discussed here, a guide path may be a predefined guide path generated and stored in a guide path repository. The guide path may also be a real time guide path generated in real time based on tracking a user using the scene-aware device as the user walks to select a start point and an end point for navigating the object. Selecting the guide path can be based on several different techniques that identify a set of coordinates of the start point and a set of coordinates of the end point and using the coordinates to facilitate selecting the guide path. By way of example, Cartesian coordinate system, in a three-dimensional space in particular may be implemented such that the start point, the end point, the guide path are represented with an ordered triplet of lines (axes) having a single unit of length for all three axes and have orientation of each axes. Upon the path-navigation component receiving a start point and an end point, the path-navigation component compares the start point and end point to determine intersections with a guide path that is selected to support navigating the objects. Other variations and combination of selecting a guide path based on a set of coordinates corresponding to a start point and end point are contemplated with embodiments described herein.

The path-navigation component 118 is responsible for performing visibility checks to identity an object path. In particular, the visibility checks can be performed based on a guide path that is selected to cause the object to traverse from a start point to an end point. At a high level, the visibility check is performed such that the object looks ahead along the guide path as much as possible to determine the next point in the guide path that is un-occluded from the current position. By doing the visibility check repeatedly during the object's movement, the object's movement advantageously takes a very optimal path with minimal computation. The path-navigation component may use several techniques in determining whether a point on the path is occluded or un-occluded. By way of example, a casting technique (e.g., ray casting or sphere casting as discussed hereinabove in more detail) can be implemented to look ahead on a guide path. The casting technique determines whether the guide path is an un-occluded point from a current position of the object. If the furthest un-occluded point (e.g., a look-ahead point) can be determined and the look-ahead point is selected as the next point of the object path for defining a path segment. In this regard, an object path includes several path segments where each path segment is defined using a current position and a look-ahead point of an object that correspond to a first point and a second point respectively of the path segment. A line between the first point and the second point is un-occluded. The path-navigation component 118 causes the object to advance along the path segment to move the object towards the end point. The visibility checks and advancement of the object are executed iteratively until the object gets to end point. Several additional factors (e.g., size of the object, gait of the object, real time changes to the scene-aware device environment) impact both the path segments and how the object is traverses based on the path segments as discussed in more detail herein.

Remedial actions can be defined in cases where the visibility check identifies dynamic occlusions in a guide path or path segment. In this regard, it contemplated that visibility checks are performed not only in defining a path segment but also as the object traverses a path segment that has been defined as un-occluded. The path-navigation component 118 supports detecting dynamic occlusions, some dynamic occlusions are identified in real time. The path-navigation component 118 further supports remedial actions to recover from occlusion on a guide path or path segment. For example, an indication that the guide segment is occluded is communicated to facilitate redefining the path segment previously identified as occluded as a new un-occluded path segment that is un-occluded. A prompt may be sent to an interactive interface of the scene-aware device such that the user performs the remedial actions. Also, in a gaming context, gameplay programming may include remedial actions for an object when an occlusion is encountered. Other variations and combinations of remedial actions for dynamic occlusions are contemplated with embodiments described herein.

Figure 8:
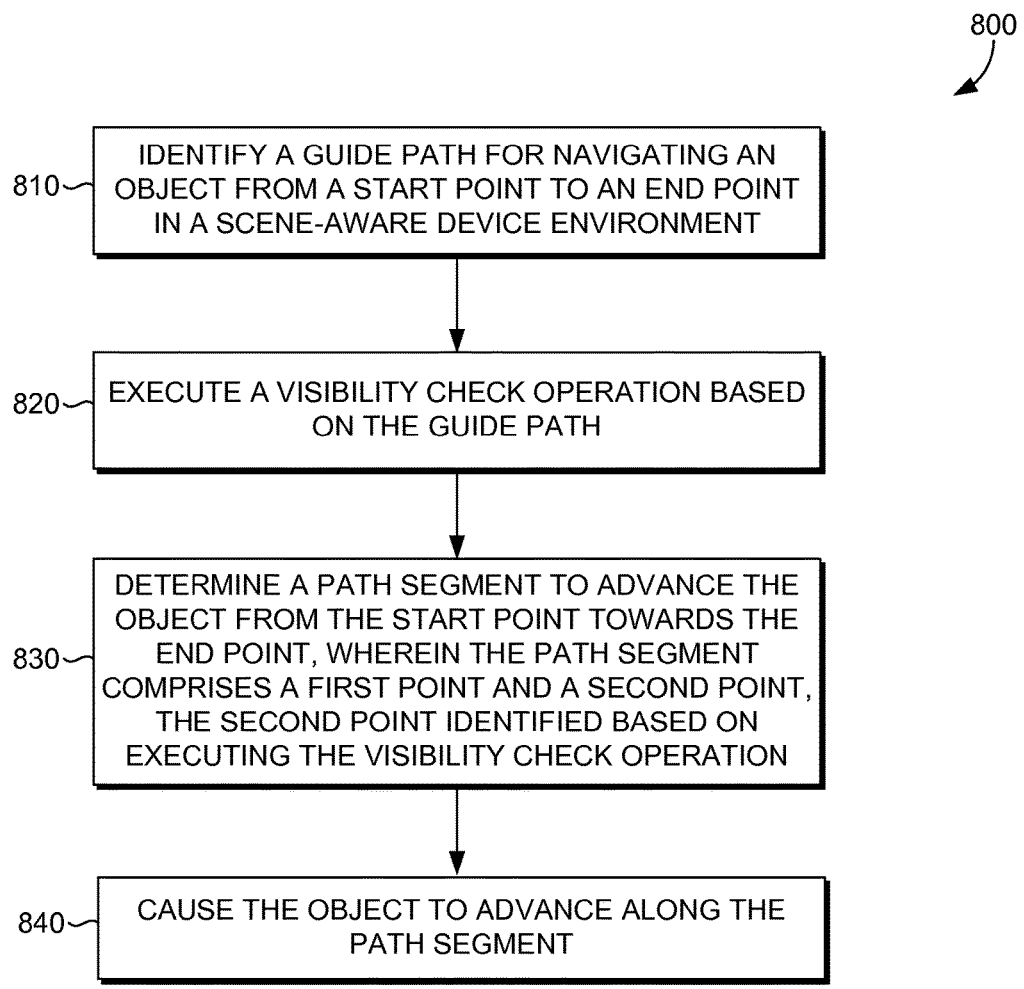
FIG. 8 is a flow diagram showing a method for object path identification and navigation, in accordance with embodiments of the present invention.

With reference to FIG. 8, a method for identifying object paths, to navigate objects in scene-aware device environments, is provided. Initially at block 810, a guide path is identified for navigating an object from a start point to an end point in a scene-aware device environment. The object identification mechanism uses a capture component and/or a path-navigation component to identify the guide path for navigating the object. A guide path can refer to a valid path (i.e., a path without occlusions) from a first point to a second point in a scene-aware device environment. Identifying the guide path can be based on the capture component performing real time tracking of a user associated with the scene-aware device to define a real time guide path from the start point to the end point. In embodiments, the real time guide path can include anterior path portion, a central path portion, and a posterior path portion. The anterior path portion and the posterior path portion are portions of the real time guide path that are not explicitly traversed when generating the real time guide path. Identifying the guide path may also include the path-navigation component selecting a guide path that is used as the framework for defining the object path. As such, the path-navigation component can select a predefined guide path that has been generated and stored in a guide path repository or select a real time guide path generated in real time from the capture component.

At block 820, a visibility check is executed based on the guide path. The path-navigation component performs the visibility check based on the guide path. At a high level, the visibility check attempts to determine the furthest un-occluded point that is un-occluded from the current point of the object. Executing a visibility check is based on the path-navigation component determining that a look-ahead point on the guide path is an un-occluded point from a current position of the object. Then, when a next look-ahead point on the guide path is occluded from the current position, the look-ahead point is selected as a next point of the object path for defining the path segment. The path segment is defined based on the current position and the look-head point such that the object traverses the path segment. At block 830, the object is advanced along the path segment. The path-navigation component advances the object along the path segment. In embodiments, path segment is altered when an occlusion in a path segment previously identified as un-occluded is detected. A remedial action, using the path-navigation component, is performed to recover from occlusion on a path segment. For example, an indication that the path segment is occluded is communicated to facilitate redefining the path segment as a new un-occluded path segment.

Figure 9:
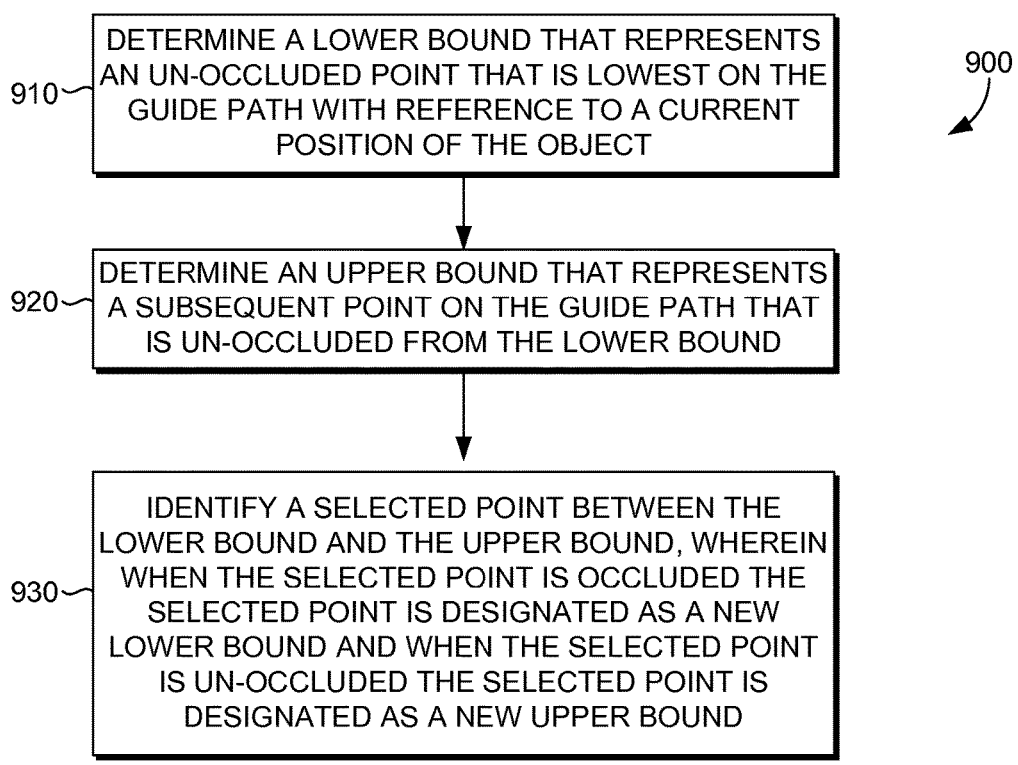
FIG. 9 is a flow diagram showing a method for object path identification and navigation, in accordance with embodiments of the present invention.

With reference to FIG. 9, a method for executing a smooth operation to smoothen a path segment to navigate an object is provided. The path-navigation component executes the smooth operation to smoothen the path segment. Initially at block 910, a lower bound that represents an un-occluded point that is lowest on the guide path with reference to a current position of the object is determined. At block 920, an upper bound that represents a subsequent point on the guide path that is un-occluded from the lower bound is determined. At block 930, a selected point (e.g., a midpoint), between the lower bound and the upper bound, is identified. When the selected point is occluded, the selected point is designated as a new lower bound, and when the selected point is un-occluded, the selected point is designated as a new upper bound.

Figure 10:
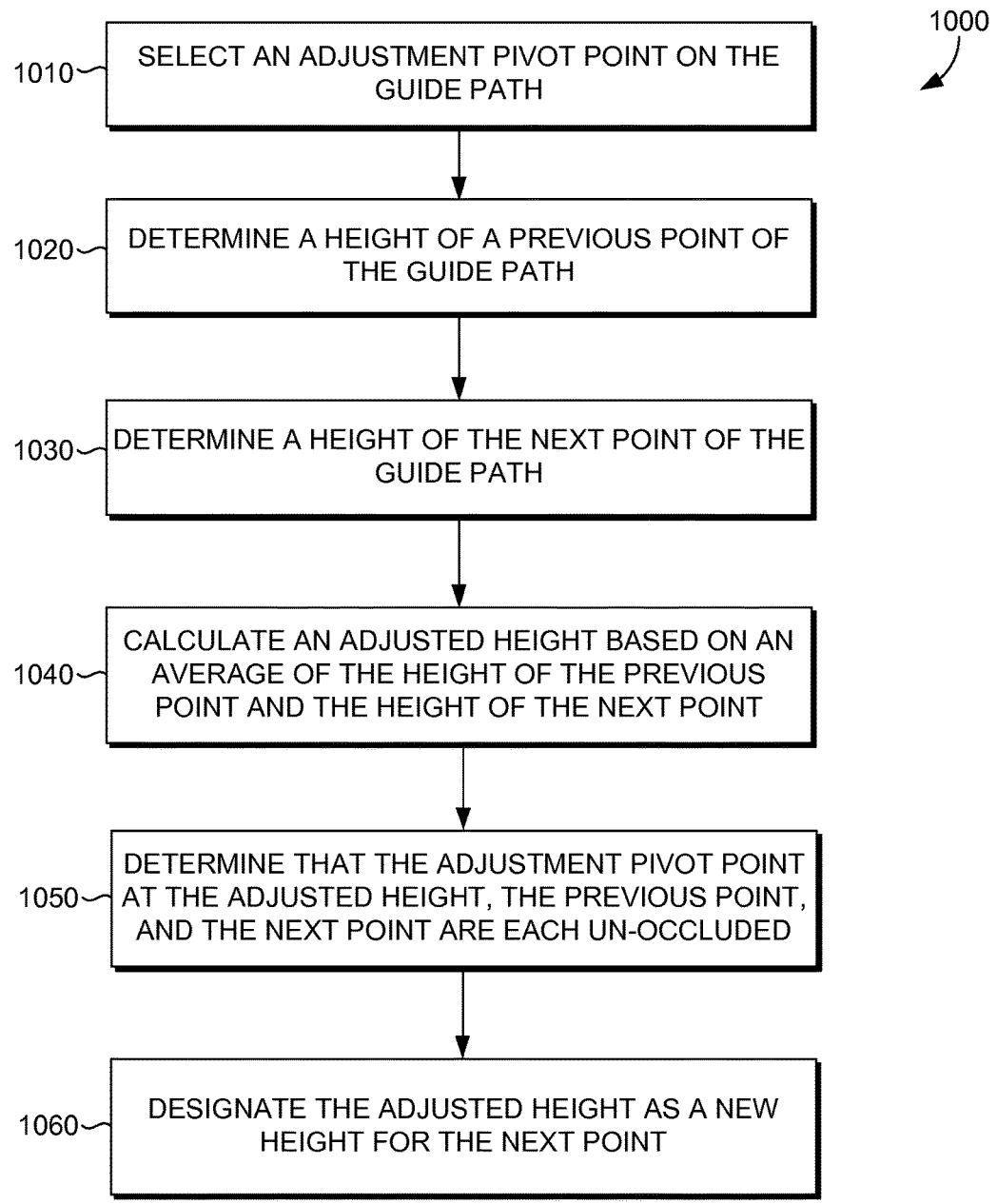
FIG. 10 is a flow diagram showing a method for object path identification and navigation, in accordance with embodiments of the present invention.

With reference to FIG. 10, a method for executing a relaxation operation to relax a height of a path segment to navigate an object is provided. The path-navigation component executes the relaxation operation. At block 1010, an adjustment pivot point on the guide path is selected. At block, 1020, a height of a previous point of the guide path is determined. At block 1030, a height of the next point of the guide path is determined. At block 1040, an adjusted height based on an average of the height of the previous point and the height of the next point is calculated. At block 1050, a determination that the adjustment pivot at the adjusted height, the previous point, and the next point are each un-occluded is made. At block 1060, the adjusted height is designated as a new height for the next point of the guide path.

Figure 11:
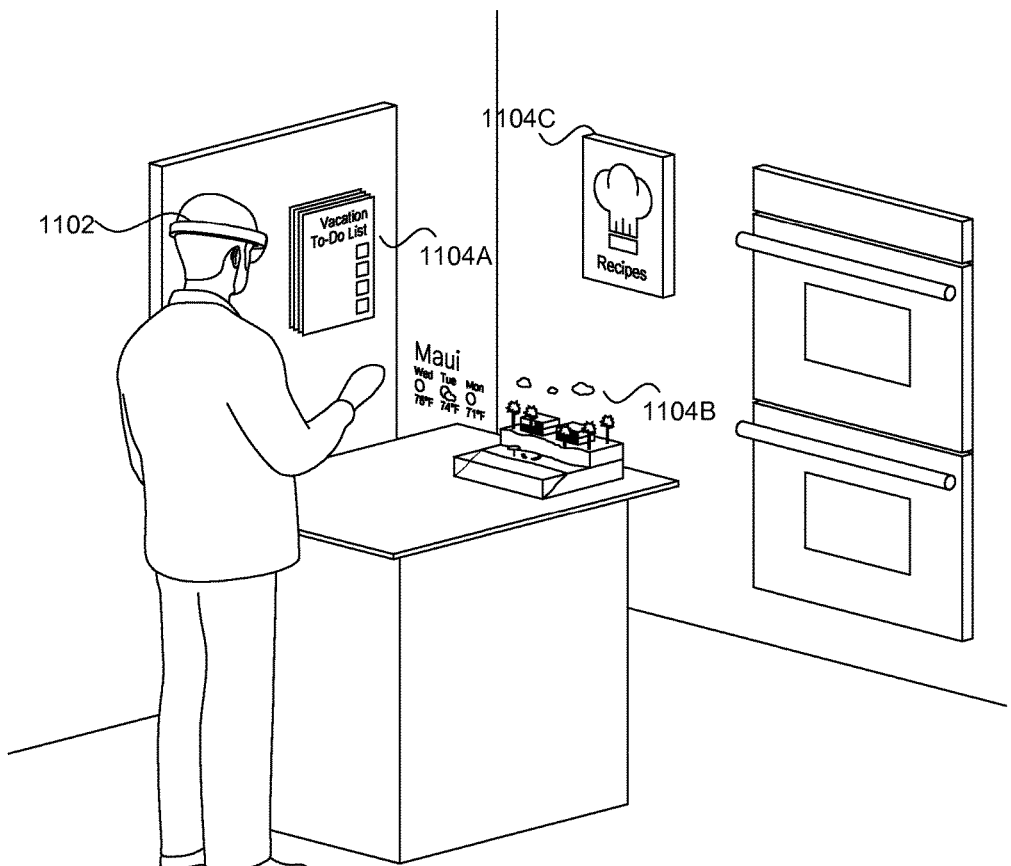
FIG. 11 is a schematic diagram showing exemplary augmented-reality images of a head-mounted display unit, in accordance with embodiments of the present invention.

With reference to FIG. 11, exemplary images of a head-mounted display (HMD) device 102 are depicted. Augmented-reality images (e.g., 1104A, 1104B and 1104C), provided by the HMD device, generally appear superimposed on a background and may appear to interact with or be integral with the background. The background is comprised of real-world scene, e.g., a scene that a user would perceive without augmented-reality image emitted by the HMD device. For example, the recipe book icon 1104C can appear superimposed and hanging in mid-air in front of the cooking oven or wall.

Figure 12:
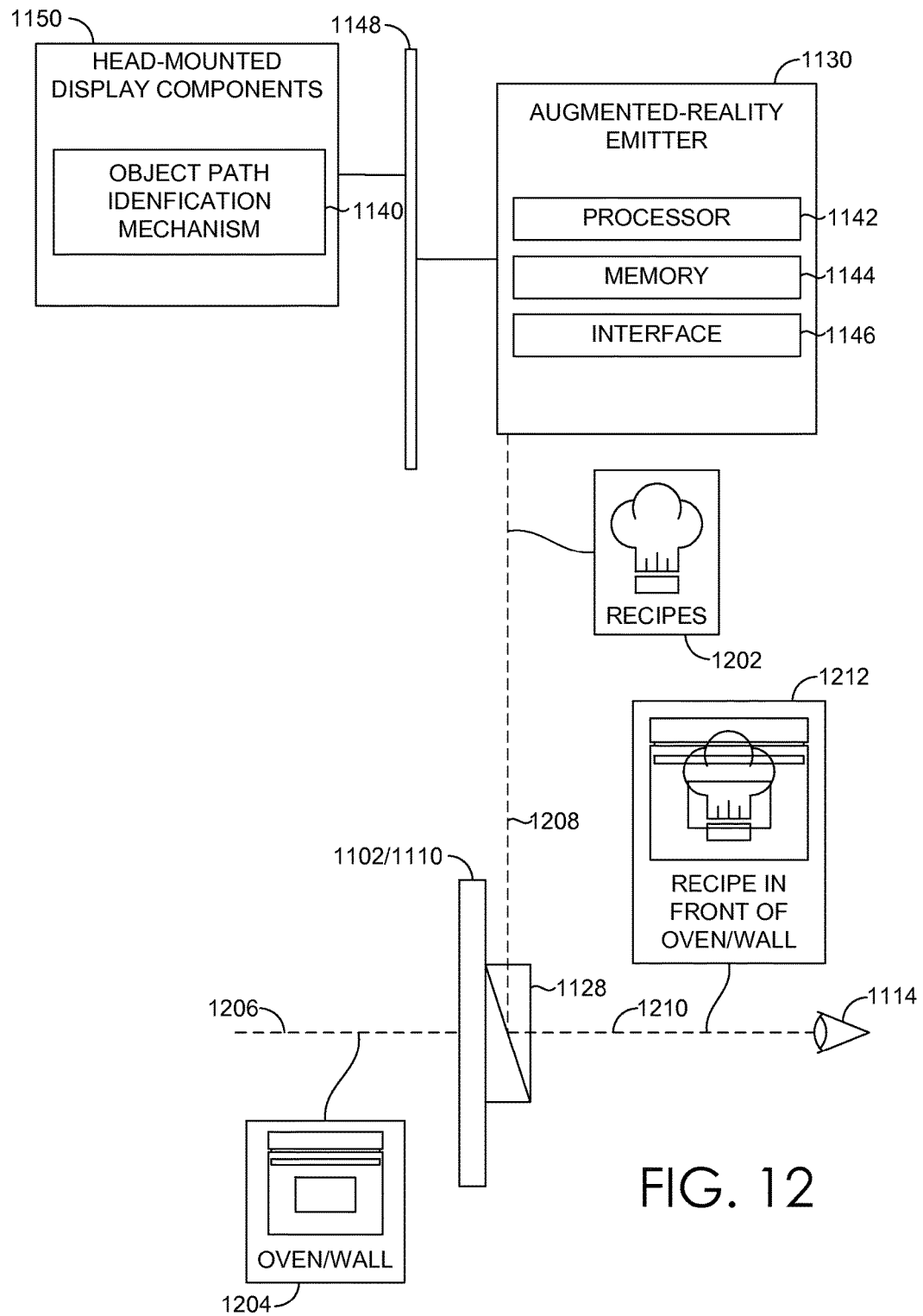
FIG. 12 is a block diagram of an exemplary head-mounted display unit, in accordance with embodiments of the present invention.

Turning to FIG. 12, the HMD device 1102 having the object path identification mechanism 1140 is described in accordance with an embodiment described herein. The HMD device 1102 includes a see-through lens 1110 which is placed in front of a user's eye 1114, similar to an eyeglass lens. It is contemplated that a pair of see-through lenses 1110 can be provided, one for each eye 1114. The lens 1110 includes an optical display component 1128, such as a beam splitter (e.g., a half-silvered mirror). The HMD device 1102 includes an augmented-reality emitter 1130 that facilitates altering the brightness of augmented-reality images. Amongst other components not shown, the HMD device also includes a processor 1142, memory 1144, interface 1146, a bus 1148, and additional HMD components 1150. The augmented-reality emitter 1130 emits light representing an augmented-reality image 202 exemplified by a light ray 208. Light from the real-world scene 1204, such as a light ray 1206, reaches the lens 1110. Additional optics can be used to refocus the augmented-reality image 1202 so that it appears to originate from several feet away from the eye 1114 rather than one inch away, where the display component 1128 actually is. The memory 1144 can contain instructions which are executed by the processor 1142 to enable the augmented-reality emitter 1130 to perform functions as described. One or more of the processors can be considered to be control circuits. The augmented-reality emitter communicates with the additional HMD components 1150 using the bus 1148 and other suitable communication paths.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The augmented-reality image 1202 is reflected by the display component 1128 toward a user's eye, as exemplified by a light ray 1210, so that the user sees an image 1212. In the image 1212, a portion of the real-world scene 1204, such as, a cooking oven is visible along with the entire augmented-reality image 1202 such as a recipe book icon. The user can therefore see a mixed-reality image 1212 in which the recipe book icon is hanging in front of the cooking oven in this example.

Figure 13:
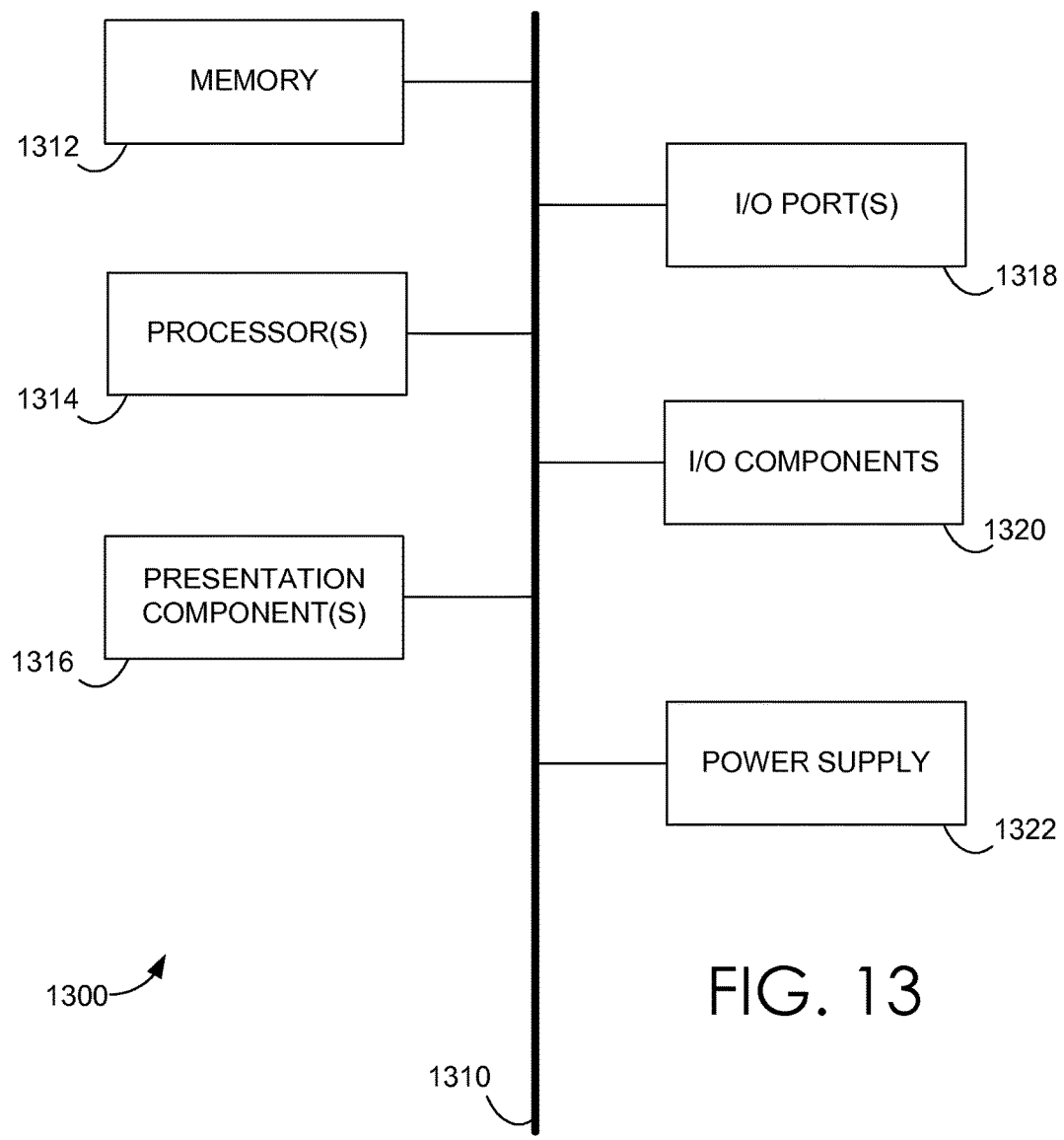
FIG. 13 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Accordingly, in one embodiment described herein, a method for identifying object paths to navigate objects in scene-aware device environments is provided. The method includes identifying a guide path for navigating an object from a start point to an end point in a scene-aware device environment. The method also includes executing a visibility check operation based on the guide path. The method further includes determining a path segment to advance the object from the start point towards the end point, the path segment comprises a first point and a second point, the second point identified based on executing the visibility check operation. The method also includes causing the object to advance along the path segment.

In some embodiments, identifying the guide path is based on real time tracking to define a real time guide path from the start point to the end point.

In some embodiments, the real time guide path comprises an anterior path portion, a central path portion, and posterior path portion, wherein the anterior path portion and the posterior path portion are portions of the real time guide path that are not explicitly traversed when generating the real time guide path.

In some embodiments, identifying the guide path is based on receiving a user indicated guide path for the scene-aware environment from the start point to the end point.

In some embodiments, selecting the guide path is based on comparing a set of coordinates of the guide path to a sets of coordinates of the start point and a set of coordinates of the end point in a scene-aware device environment.

In some embodiments, executing a visibility check comprises determining that a look-ahead point on the guide path is an un-occluded point from a current position of the object, wherein the look-ahead point is proximate an occluded point on the guide path; and selecting the look-ahead point as a next point of the object path for defining the path segment, the path segment is defined based on the current position and the look-head point such that the object traverses the path segment.

In some embodiments smoothing the path segment is performed based on executing a smoothing operation comprising determining a lower bound that represents an un-occluded point that is lowest on the guide path with reference to a current position of the object; determining an upper bound that represents a subsequent point on the guide path that is un-occluded from the lower bound; and identifying a selected point between the lower bound and the upper bound, wherein when the selected point is occluded the selected point is designated as a new lower bound and when the selected point is un-occluded the selected point is designated as a new upper bound.

In some embodiments, relaxing the path segment is performed based on executing a relaxation operation comprising selecting an adjustment pivot point on the guide path; determining a height of a previous point of the guide path; determining a height of the next point of the guide path; calculating an adjusted height based on an average of the height of the previous point and the height of the next point; determining that the adjustment pivot point at the adjusted height, the previous point, and the next point are each un-occluded; and designating the adjusted height as a new height for the next point.

In some embodiments, adapting the path segment to a motion is performed based on executing a motion adaptation operation comprising determining a motion feature corresponding to movement associated with the object; and applying the motion feature, based on attributes of the motion feature, to the path segment such that the object path is adapted to incorporate the motion feature.

In some embodiments, an occlusion in a path segment previously identified as un-occluded is detected; and an indication that the path segment is occluded is communicated to facilitate redefining the path segment as a new path segment that is un-occluded.

In another embodiment described herein, one or more computer storage media having computer-executable instructions embodied thereon that, when executed, by one or more processors, causes the one or more processors to execute operations for identifying object paths to navigate objects in a scene-aware device environment, is provided. The operations include identifying a guide path for navigating an object from a start point to an end point in a scene-aware device environment. The guide path is selected based on a set of coordinates of the start point and a set of coordinates of the end point. The operations also include executing a visibility check operation that determines that a look-ahead point on the guide path is an un-occluded point, the visibility check operation comprising casting in the scene-aware environment based on attributes of the object traversing the path segment. The operations further include determining a path segment to advance the object from the start point towards the end point, the path segment comprises a first point and a second point, the second point identified based on executing the visibility check operation. The operations include causing the object to advance along the path segment.

In some embodiments, casting is executed in executing the visibility check operation based on attributes of an anticipated object utilizing the guide path.

In some embodiments executing a visibility check comprises determining that a look-ahead point on the guide path is an un-occluded point from a current position of the object; and selecting the look-ahead point as a next point of the object path for defining the path segment, the path segment is defined based on the current position and the look-head point such that the object traverses the path segment.

In some embodiments iteratively executing both a smoothing operation to smoothen the path segment and a relaxation operation to relax a height of the path segment is performed.

In some embodiments, the object is caused to advance along the path segment further comprises casting in the scene-aware environment based on attributes of the object corresponding to movement associated with the object; applying the motion feature, based on attributes of the motion feature, to the path segment such that the object path is adapted to incorporate the motion feature; and causing the object to traverse along an adapted path segment based on apply the motion feature.

In yet another embodiment described herein, a system for identifying object paths to navigate objects in scene-aware device environments is provided. The system includes a processor and a memory configured for providing computer program instructions, associated with computer components, to the processor. The system further includes a path-navigation component configured to identify a guide path for navigating an object from a start point to an end point in a scene-aware device environment; execute a visibility check operation using the guide path; determine a path segment to advance the object from the start point towards the end point, wherein the path segment comprises a first point and a second point, the second point identified based on executing the visibility check operation; and cause the object to advance along the path segment.

In some embodiments, the system further includes a capture component configured to capture a real world environment to identify the guide path is based on real time tracking, wherein real time tracking operates to define a real time guide path from the start point to the end point, wherein the real time guide path comprises an anterior path portion, a central path portion, and posterior path portion, wherein the anterior path portion and the posterior path portion are portions of the real time guide path that are not explicitly traversed when generating the real time guide path.

In some embodiments, the system further includes a path-navigation component configured to select a guide path from a plurality of predefined guide paths for a scene-aware device environment, the plurality of guide paths include one or more guide paths that are manually defined based on a selection of a path within the scene-aware environment.

In some embodiments, the system further includes a path-navigation component configured to execute supplementary operations, wherein supplementary operations comprises one of a smoothing operation comprising: determining a lower bound that represents an un-occluded point that is lowest on the guide path with reference a current position of the object; determining an upper bound that represents a subsequent point on the guide path that is un-occluded from the lower bound; and identifying a selected point between the lower bound and the upper bound, wherein when the selected point is occluded the selected point is designated as a new lower bound and when the selected point is un-occluded the selected point is designated as a new upper bound; and a relaxation operation comprising selecting an adjustment pivot point on the guide path; determining a height of a previous point of the guide path; determining a height of the next point of the guide path; calculating an adjusted height based on an average of the height of the previous point and the height of the next point; determining that the adjustment pivot at the adjusted height, the previous point, and the next point are each un-occluded; and designating the adjusted height as a new height for the adjustment pivot point.

In some embodiments, the system further includes the path-navigation component configured to detect an occlusion in a path segment previously identified as un-occluded; and communicate an indication that the path segment is occluded to facilitate redefining the path segment as a new path segment that is un-occluded.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for identifying object paths to navigate objects in scene-aware device environments, the method comprising:

identifying a guide path for navigating an object from a start point to an end point in a scene-aware device environment comprising a virtual representation of a real-world environment, wherein the guide path is a first path captured by a scene-aware device as a guide for determining an object path, wherein the object path is a second path for navigating the object through the scene-aware device environment;

determining a path segment of the object path based on the guide path to advance the object from the start point towards the end point, wherein the path segment comprises a first point and a second point, and wherein the second point is identified on the guide path by iteratively executing a visibility check operation; and causing the object to advance along the path segment in the scene-aware device environment.

2. The method of claim 1, wherein identifying the guide path is captured by tracking in real-time a movement of the scene-aware device to define a real time guide path from the start point to the end point.

3. The method of claim 2, wherein the real time guide path comprises an anterior path portion, a central path portion, and posterior path portion, wherein the anterior path portion and the posterior path portion are portions of the real time guide path that are not explicitly traversed by the movement of the scene-aware device.

4. The method of claim 1, wherein the identifying of the guide path is based on receiving a user indicated guide path for the scene-aware environment from the start point to the end point.

5. The method of claim 1, wherein the identifying of the guide path is based on receiving the start point and the end point and selecting the guide path is based on comparing a set of coordinates of the guide path to a set of coordinates of the start point and a set of coordinates of the end point in a scene-aware device environment.

6. The method of claim 1, wherein the executing of the visibility check comprises:
  determining that a look-ahead point on the guide path is an un-occluded point from a current position of the object, wherein the look-ahead point is proximate to an occluded point on the guide path; and
  selecting the current position as the first point of the path segment and the look-ahead point as the second point of the path segment.

7. The method of claim 1, wherein the iteratively executing the visibility check operation comprising:
  determining a lower bound that represents an un-occluded point on the guide path from a current position of the object;
  determining an upper bound that represents a subsequent occluded point on the guide path from the current position of the object; and
  identifying a selected point between the lower bound and the upper bound, wherein when the selected point is un-occluded the selected point is designated as a new lower bound and when the selected point is occluded the selected point is designated as a new upper bound.

8. The method of claim 1, further comprising relaxing the path segment based on executing a relaxation operation comprising:
  selecting an adjustment pivot point on the guide path;
  determining a height of a previous point of the guide path;
  determining a height of the next point of the guide path;
  calculating an adjusted height based on an average of the height of the previous point and the height of the next point;
  determining that the adjustment pivot point at the adjusted height, the previous point, and the next point are each un-occluded; and
  designating the adjusted height as a new height for the next point.

9. The method of claim 1, further comprising motion adapting the path segment based on executing a motion adaptation operation comprising:
  determining a motion feature corresponding to movement associated with the object; and
  applying the motion feature, based on attributes of the motion feature, to the path segment such that the object path is adapted to incorporate the motion feature.

10. The method of claim 1, further comprising:
  detecting an occlusion for the path segment previously identified as un-occluded; and
  communicating an indication that the path segment is occluded to facilitate redefining the path segment as a new path segment that is un-occluded.

11. One or more computer storage media having computer-executable instructions embodied thereon that, when executed, by one or more processors, causes the one or more processors to execute operations for identifying object paths to navigate objects in a scene-aware device environment, the operations comprising:
  identifying a guide path for navigating an object from a start point to an end point in a scene-aware device environment comprising a virtual representation of a real-world environment, wherein the guide path is a first path selected based on a set of coordinates of the start point and a set of coordinates of the end point received by a scene-aware device;
  determining a path segment of a second path to advance the object from the start point towards the end point, wherein the path segment comprises a first point and a second point, and wherein the second point is identified on the guide path by executing the visibility check operation that determines that a look-ahead point on the guide path is an un-occluded point;
  causing the object to advance along the path segment in the scene-aware device environment;
  while causing the object to advance along the path segment towards the second point, determining a next second point by executing the visibility check operation based on a current location of the object and adjusting the path segment based on the next second point; and
  causing the object to advance along the adjusted path segment in the scene-aware device environment.

12. The media of claim 11, wherein the executing of the visibility check operation comprises casting based on attributes of an anticipated object utilizing the guide path.

13. The media of claim 11, wherein the executing of the visibility check comprises:
  determining that the look-ahead point on the guide path is un-occluded from a current position of the object, the visibility check operation comprising casting in the scene-aware environment based on attributes of the object traversing a path segment of the second path; and
  selecting the look-ahead point as the second point of the path segment.

14. The media of claim 11, further comprising iteratively executing both a smoothing operation to smoothen the path segment and a relaxation operation to relax a height of the path segment.

15. The media of claim 11, wherein causing the object to advance along the path segment further comprises:
  casting in the scene-aware environment based on attributes of the object corresponding to movement associated with the object;
  applying the motion feature, based on attributes of the motion feature, to the path segment such that the object path is adapted to incorporate the motion feature; and
  causing the object to traverse along an adapted path segment based on applying the motion feature.

16. A system for identifying object paths to navigate objects in scene-aware device environments, the system comprising:
- a processor and a memory configured for providing computer program instructions to the processor;
- a path-navigation component configured to:
  - identify, with a scene aware device, a guide path for navigating an object from a start point to an end point in a scene-aware device environment comprising a virtual representation of a real-world environment, wherein the guide path is a first path;
  - determine a path segment on a second path based on the guide path to advance the object from the start point towards the end point, wherein the path segment comprises a first point and a second point, wherein the path-navigation component is configured to identify the second point on the guide path by iteratively executing the visibility check operation; and
  - cause the object to advance along the path segment in the scene-aware device environment.

17. The system of claim 16, further comprising a capture component of the scene aware device configured to capture a real world environment, and capture the guide path by tracking in real-time a movement of the capture component, wherein the tracking is configured to define a real time guide path from the start point to the end point, wherein the real time guide path comprises an anterior path portion, a central path portion, and posterior path portion, wherein the anterior path portion and the posterior path portion are portions of the real time guide path that are not explicitly traversed by the movement of the capture component.

18. The system of claim 16, wherein the path-navigation component is configured to identify the guide path based on a selection among a plurality of predefined guide paths for the scene-aware device environment, wherein the plurality of guide paths include one or more guide paths having been manually defined.

19. The system of claim 16, wherein the path-navigation component is configured to execute supplementary operations, wherein the supplementary operations comprise at least one of:
- a smoothing operation comprising:
  - determining a lower bound that represents an un-occluded point on the guide path from a current position of the object;
  - determining an upper bound that represents a subsequent occluded point on the guide path from the current position of the object; and
  - identifying a selected point between the lower bound and the upper bound, wherein when the selected point is un-occluded the selected point is designated as a new lower bound and when the selected point is occluded the selected point is designated as a new upper bound; or
- a relaxation operation comprising:
  - selecting an adjustment pivot point on the guide path;
  - determining a height of a previous point of the guide path;
  - determining a height of the next point of the guide path;
  - calculating an adjusted height based on an average of the height of the previous point and the height of the next point;
  - determining that the adjustment pivot at the adjusted height, the previous point, and the next point are each un-occluded; and
  - designating the adjusted height as a new height for the adjustment pivot point.

20. The system of claim 16, wherein the path-navigation component is configured to:
- detect an occlusion for the path segment previously identified as un-occluded; and
- communicate an indication that the path segment is occluded to facilitate redefining the path segment as a new path segment that is un-occluded.

* * * * *